(12) United States Patent
Seliuchenko

(10) Patent No.: US 10,859,680 B2
(45) Date of Patent: Dec. 8, 2020

(54) ACTIVE PIXEL CIRCUIT FOR A TIME-OF-FLIGHT SYSTEM AND METHOD FOR OPERATING THE SAME

(71) Applicant: Melexis Technologies NV, Tessenderlo (BE)

(72) Inventor: Volodymyr Seliuchenko, Nashua, NH (US)

(73) Assignee: MELEXIS TECHNOLOGIES NV, Tessenderlo (BE)

(*) Notice: Subject to any disclaimer, the term of this patent is extended or adjusted under 35 U.S.C. 154(b) by 391 days.

(21) Appl. No.: 15/952,706

(22) Filed: Apr. 13, 2018

(65) Prior Publication Data

US 2018/0306909 A1    Oct. 25, 2018

(30) Foreign Application Priority Data

Apr. 21, 2017 (EP) .................................. 17167584

(51) Int. Cl.
*G01C 3/08* (2006.01)
*G01S 7/4861* (2020.01)
(Continued)

(52) U.S. Cl.
CPC ............ *G01S 7/4861* (2013.01); *G01S 7/493* (2013.01); *G01S 7/4914* (2013.01); *G01S 17/36* (2013.01); *G01S 17/89* (2013.01)

(58) Field of Classification Search
CPC ...... G01S 7/4861; G01S 7/4914; G01S 7/493; G01S 17/89; G01S 17/894; G01S 17/36
(Continued)

(56) References Cited

U.S. PATENT DOCUMENTS 8,203,699 B2    6/2012  Bamji et al.
2006/0157643 A1* 7/2006  Bamji .................. G01S 7/4868
                                                    250/208.1
(Continued)

FOREIGN PATENT DOCUMENTS

EP          2541275 A1    1/2013

OTHER PUBLICATIONS

Davidovic et al., "Range Finding Sensor in 90nm CMOS with Bridge Correlator Based Background Light Suppression," 2010 Proceedings of the Esscirc, Sep. 14, 2010, pp. 298-301.
(Continued)

*Primary Examiner* — Mark Hellner
(74) *Attorney, Agent, or Firm* — Workman Nydegger

(57) ABSTRACT

A pixel circuit for performing Time of Flight measurements comprises at least one optical sensor arranged for receiving a reference modulation signal and a light signal and arranged for outputting a photocurrent signal depending on the light signal and on a phase shift corresponding to a phase difference between the light signal and the reference modulation signal, and an integrator circuit comprising an integration capacitor, an amplifier, and switching mean. The switching means is arranged for resetting the integration capacitor in a reset mode, for connecting the integration capacitor between the at least one optical sensor and a voltage reference signal in a passive mode. The negative feedback loop is fed with the photocurrent signal of the at least one optical sensor, and for connecting a signal output by the integrator circuit to an output bus in a readout mode.

14 Claims, 8 Drawing Sheets

(51) Int. Cl.
　　　*G01S 17/36*　　　(2006.01)
　　　*G01S 7/493*　　　(2006.01)
　　　*G01S 17/89*　　　(2020.01)
　　　*G01S 7/4914*　　　(2020.01)
(58) Field of Classification Search
　　　USPC ........................................................ 356/5.01
　　　See application file for complete search history.

(56) References Cited

U.S. PATENT DOCUMENTS

2006/0192938 A1\*　8/2006　Kawahito ............. H01L 31/101
　　　　　　　　　　　　　　　　　　　　　356/5.03
2018/0191936 A1\*　7/2018　Wang ................. H04N 5/23241

OTHER PUBLICATIONS

Davidovic et al., "Time-of-Flight Range Finding Sensor Using an Integrated PNP PIN Phototransistor in 180 nm CMOS," 2012 IEEE 9th International Conference on Group IV Photonics (GFP), Aug. 29, 2012, pp. 258-260.
Extended European Search Report from EP Application No. EP 17167584.6, dated Oct. 26, 2017.

\* cited by examiner

ACTIVE PIXEL CIRCUIT FOR A TIME-OF-FLIGHT SYSTEM AND METHOD FOR OPERATING THE SAME

FIELD OF THE INVENTION

The present invention is generally related to the field of time-of-flight systems. More in particular it relates to solutions for increasing the dynamic range of such systems.

BACKGROUND OF THE INVENTION

Time-of-Flight (ToF) is a method for measuring the distance between a sensor and an object, based on the time difference between the emission of a signal and its return to the sensor, after being reflected by an object. Various types of signals (also called carriers) can be used with ToF, a very common one being light.

A conventional scheme of a ToF pixel is shown in FIG. 1. It uses three transistors SEL, SF and RT and a capacitance C to perform readout of the ToF photocurrent flowing out of the demodulating photodetector DEM. Since the demodulator typically has two outputs (0° and 180° demodulated photocurrent), the same readout circuit is duplicated in every pixel. The operation starts with resetting the integration capacitance to initial voltage by applying a pulse to the gate of RT transistor. Then, the photocurrent is integrated on the capacitance C for some integration time. At the end of the integration, the source follower SF is connected to the column busses through SEL switch and the voltage signal on the capacitance C, buffered by a source follower transistor SF is read out on the column busses A and B which are biased by current sources.

A ToF signal typically comprises two parts, namely modulated AC light and constant background light. The magnitude of the background signal can greatly exceed the useful modulated signal magnitude, which puts challenging requirements on the pixel dynamic range. This issue is conventionally tackled by making the charge integration node quite big and splitting the frame into several microframes with short integration times. This prior art approach has at least three important drawbacks. First, the use of a big integration capacitor introduces reset kT/C noise and lowers the pixel's conversion gain significantly degrading the Time-of-Flight sensor performance in darkness. Further, splitting a frame into a plurality of microframes increases the requirements on the ADC bandwidth. It also increases the power consumption and indirectly degrades (through increased ADC noise and higher on-chip temperature) the dark performance of the sensor. Finally, the overall pixel sensitivity is lowered because the big in-pixel integration and sample&hold capacitors reduce the fill factor (i.e. the ratio of the light sensitive area to the total pixel area).

In order to achieve an optimal SNR, the pixel integration capacitor of simple sample-and-hold pixels should be properly sized to accommodate maximum expected photo charge per microframe, which is mostly defined by sunlight intensity, light source duty cycle and frame readout speed. For outdoor applications, the main factor defining the size of the integration capacitors is the constant background light signal. Large capacitances result in low pixel conversion gain and lower pixel fill factor. Low conversion gain increases the readout noise adversely affecting pixels with lower signal amplitude due to e.g. lower object reflectivity. If the constant background part of the signal is removed the integration capacitors can be made smaller, hence, increasing the conversion gain.

The trade-off between the dark signal sensitivity and background light robustness can be resolved by appropriately implementing the integration capacitor. Solutions have been suggested wherein a choice between two integration capacitors is available. Depending on the scene, the application can then decide whether to use a small integration capacitor or a big one. It provides only a partial solution to the problem since practically the selection of low or high gain is made globally per the whole array of pixels—thus, in a high sunlight conditions, pixels receiving low signal from low reflectivity objects would be operating in a low gain mode with deteriorated performance.

Another solution is described in U.S. Pat. No. 8,203,699 B2 where integration of the differential ToF signal is done on two relatively small capacitors (thus it benefits from the high conversion gain) and, during the integration, several common mode resets are done by connecting the two integration capacitors inverting the polarity of one of them. This way the common mode signal is cancelled and the differential ToF signal is preserved. This approach has a significant disadvantage, namely that the practical implementation of the integration capacitor always has parasitics associated with at least one of its terminals. Every time the common mode reset occurs in such a system the charge stored on these parasitic capacitors is lost and the ToF signal gets significantly deteriorated. The amount of signal, lost at every common mode reset, is proportional to the magnitude of the integrated signal. The circuit thus behaves like a resistive load connected to the photodiodes rather than like a capacitive integrator where the effective resistance is determined by the parasitic capacitance magnitude and by the common mode reset frequency. The effectiveness of the background light subtraction in such a circuit is greatly reduced by unavoidable parasitic capacitance.

Another solution to the background signal suppression could be photocurrent subtraction, for example using MOS current mirror circuits. However, due to a high mismatch of the current mirrors biased by low photocurrents, this solution turns out to be impractical.

Yet another solution to the background signal suppression could be building an operational amplifier based differential integrator as is well-known in the art. However, the power consumption of the operational amplifier puts limits on achievable resolution of ToF sensor array. Also the typical operational amplifier area is comparable to or larger than the typical ToF pixel size, thus the fill factor of such an operational amplifier based pixel would be very low.

Thus, there is a need for a solution to the background light subtraction problem which can provide high suppression for the background light, while allowing a high conversion gain for the differential ToF signal and having low power consumption and area.

SUMMARY OF THE INVENTION

It is an object of embodiments of the present invention to provide for an active pixel circuit wherein negligible signal charge is lost through parasitic capacitance when integration capacitor commutation occurs.

The above objective is accomplished by the solution according to the present invention.

In a first aspect the invention relates to a pixel circuit for performing Time of Flight measurements comprising
at least one optical sensor arranged for receiving a reference modulation signal and a light signal and arranged for outputting a photocurrent signal depending on said light signal and on a phase shift corresponding to a phase difference between said light signal and said reference modulation signal, an integrator circuit comprising an integration capacitor, an amplifier and switching means, whereby said switching means are arranged for resetting said integration capacitor in a reset mode, for connecting said integration capacitor between said at least one optical sensor and a voltage reference signal in a passive mode, for connecting in an active mode said integration capacitor in a negative feedback loop comprising said amplifier, said negative feedback loop being fed with said photocurrent signal of said at least one optical sensor, and for connecting a signal output by said integrator circuit to an output bus in a readout mode.

The proposed solution indeed allows achieving the above-mentioned objectives. The proposed circuit has a low power consumption, as most of the time the pixel is self-biased with photocurrent. By switching between active and passive modes saturation in the presence of strong background light can be avoided. Adverse parasitic capacitance effects are removed by keeping the capacitor node connected to a low impedance.

In a preferred embodiment the amplifier of the integrator circuit is biased by the photocurrent signal during the active mode.

In an advantageous embodiment the integrator circuit is arranged for receiving additional electrical current during transitions between the passive mode and the active mode. The pixel circuit may then comprise an additional electrical current source for providing that additional electrical current.

In one embodiment a switch of the switching means is arranged to act as a current source for providing the additional electrical current.

Preferably the integrator circuit is arranged to be biased by additional electrical current when operating in the active mode.

In another embodiment the pixel circuit comprises at least two optical sensors arranged for outputting signals with a different phase. In one embodiment said phase shift of the photocurrent signal is obtained by commutating between the output signals of the at least two optical sensors.

Advantageously, the pixel circuit is arranged for adjusting a ratio of operation in the active mode and the passive mode during a frame acquisition time.

In one embodiment the pixel circuit comprises a buffer circuit for buffering the signal output by the integrator circuit.

In a more specific embodiment the integrator circuit is implemented as a transistor having a source terminal, a drain terminal and a gate terminal. The transistor is arranged for receiving at said source terminal a supply voltage from which said voltage reference signal is generated, having said drain terminal connected to said row select transistor and having said drain terminal and said gate terminal connected via a first switch. The drain terminal is further connected via a second switch to a first charge sensing node. That first charge sensing node connected to said first photodiode demodulator via a third switch and connected to a second charge sensing node via an integration capacitor, whereby the second charge sensing node is connected to the gate terminal and connected via a fourth switch to the second photodiode demodulator and further also connected to ground via a parasitic capacitance.

In another aspect the invention relates to a method for operating a pixel circuit as in previously described in a Time of Flight measurement. The method comprises:

resetting said integration capacitor, activating a passive integration mode by adapting said switching means of said pixel circuit, connecting said integration capacitor during an active mode in a negative feedback loop comprising said amplifier of said pixel circuit and applying said photocurrent signal of said at least one optical sensor to said negative feedback loop, connecting a signal output by said integrator circuit to an output bus in a readout mode.

In one embodiment the active mode is activated before the passive mode.

In an embodiment at least two times is switched between the active and the passive modes.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
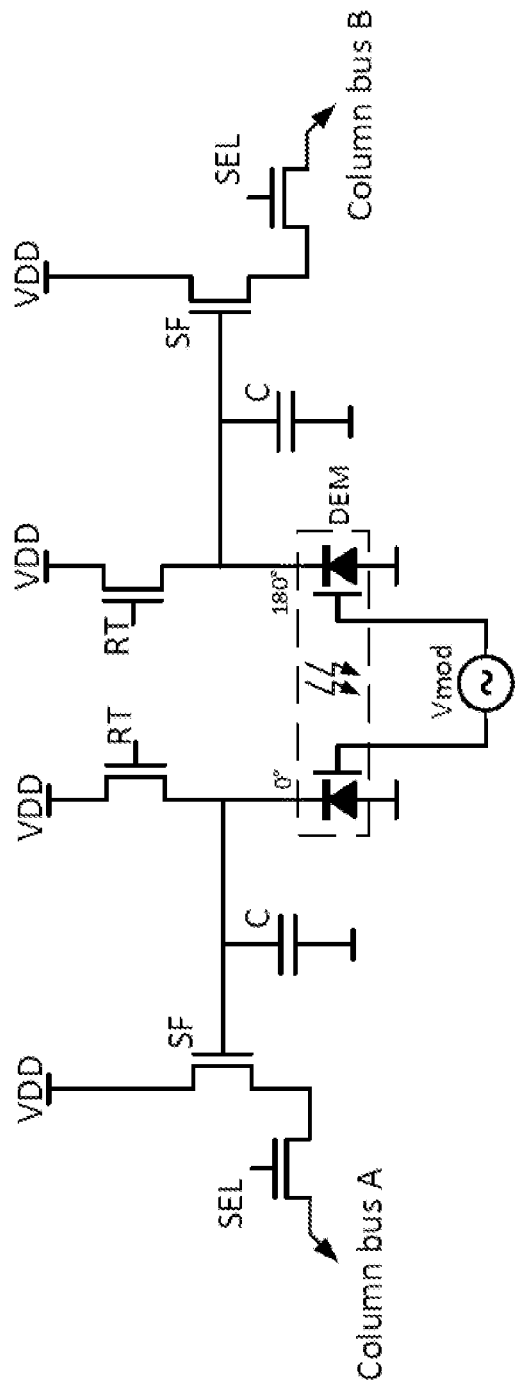
FIG. 1 illustrates a Time of Flight pixel circuit as known in the art.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The pixel circuit according to the present invention effectively deals with the background light subtraction issue and can be implemented in a small area. In the solution proposed in this invention the pixel circuit comprises an integrator circuit that can operate in a passive and in an active mode.

Figure 2:
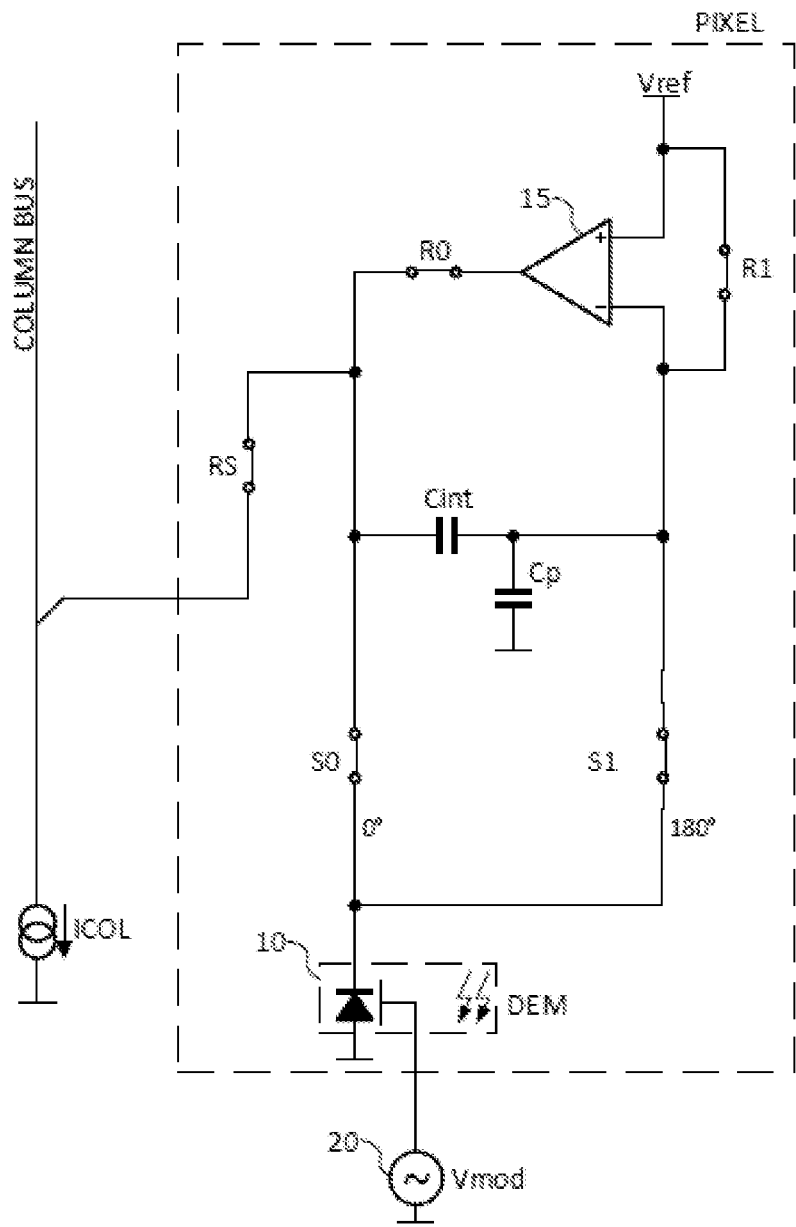
FIG. 2 illustrates the proposed pixel circuit.

A generic scheme of an embodiment of the active pixel circuit according to the invention is shown in FIG. 2. The pixel circuit for performing Time of Flight measurements comprises at least one optical sensor (10) that receives a reference modulation signal (20) and an incident light signal. The sensor outputs a photocurrent signal which depends on the light signal and on a phase shift corresponding to a difference in phase between the light signal and the reference modulation signal. The pixel circuit further comprises an integrator circuit with an integration capacitor (Cint), an amplifier (15) and switches (R0, R1, S0, S1, RS). The amplifier receives at its inputs a signal coming from the optical sensor and a voltage reference signal, which can either be internally generated or originate from an external voltage source.

The optical sensor can be implemented in various ways. One option is to have a single ended detector, which can deliver a demodulated photocurrent signal with an arbitrary phase shift. An implementation of this can be a photonic demodulator capable of demodulating the received light signal. Some practical examples are a current assisted photonic demodulator (CAPD), a photonic mixer device (PMD) and a photodiode with switches. Other options are available, however. The optical sensor demodulation phase is determined by a phase shift of the reference signal, applied to the demodulator's control terminal (for example CAPD ohmic contacts to substrate or PMD gates). Alternatively, a dual ended detector can be used to deliver a pair of 180 degrees out of phase photocurrent signals. In this case the pixel circuit can be duplicated, each of the two circuits connected to the two outputs of the dual ended demodulator. Some practical implementation examples of dual ended detectors are a current assisted photonic demodulator (CAPD), a photonic mixer device (PMD) and a photodiode with switches. Other options are available, however.

The integrator circuit comprises amplification means. In one embodiment a single transistor provides the amplification. This is a preferred embodiment as it meets the fill factor constraints. The fill factor is one of the most critical parameters in the design of a pixel circuit and represents a ratio of the light sensitive area to the total area of the pixel. In another embodiment an operational amplifier (opamp) with multiple transistors is used.

In one embodiment the amplifier of the integrator circuit is biased by the received photocurrent signal during the active mode. Alternatively, the biasing can be achieved by means of dedicated components. For example, a dedicated current source can be used.

The switches in the integrator circuit reset the integration capacitor during operation and establish the changes in working mode. In certain embodiments one or more switches not only work as commutation component, but also serve another purpose, e.g. biasing the amplifier. As an example, in one embodiment the row select switch can be used as a current source to bias the amplifier.

The integrator circuit in the pixel circuit of the present invention can operate in passive and active modes. Passive and active modes have opposite integration signs, so that the common mode signal is subtracted and the differential signal accumulated. In practice, parasitic capacitance of the integration capacitor is unavoidable. However, a capacitor can be designed in a way that the parasitics are connected to just one plate and the other plate only has a negligible amount of parasitics (for example, when one of the electrodes completely encloses the other one). The proposed approach keeps the capacitor node with high parasitic capacitance always connected to a low impedance, thus cancelling adverse effects of the parasitic capacitances. The main advantage of the proposed architecture is low power consumption since most of the time the pixel is self-biased with photocurrent. Optionally, during toggling between the active and passive modes the pixel can be biased with extra current. In this case the overall pixel consumption is not significantly increased, since the extra bias current is applied only during a fraction of the whole frame integration time, while the accuracy of the constant background signal photocurrent can be substantially improved.

To be more precise, there are four modes of operation for the pixel circuit of this invention. In a reset mode the integration capacitor is preset to a predefined voltage, e.g. by shorting its plates. Reset noise kTC is thereby injected. In the passive mode the integration capacitor is discharged directly by a photocurrent. The amplifier can be reconfigured so that it can serve as a reference voltage signal. In the active mode the integration capacitor is a part of the feedback loop of the amplifier. Finally, in the readout mode the integrated charge is read out. The active integrator amplifier can be used as a component to drive the column bus. An optional dedicated buffer can be added to drive the column bus.

The order of applying the active and passive mode may be different from one embodiment to another. Further, for an embodiment where the amplifier is biased by the photocurrent, some additional biasing may be required to switch between active and passive modes to reduce a dependency of the amplifier's operating point on the photocurrent magnitude which may lead to background light cancellation errors. Typically, an extra biasing current of one to several orders of magnitude larger than the photocurrent may be used to minimize such an error. This extra biasing current can be applied only during a short period of time during the transition between the active and passive modes, thus not introducing a considerable increase of the power consumption to the whole sensor (it may be less than the power consumption of the photonic demodulator).

Due to mismatch of the parasitic components, the integration gain may be slightly different for the passive and active modes. The duty cycle (i.e. the ratio of active and passive modes during the integration) may be adjusted to compensate for the difference in integration gain between the active and passive modes.

Figure 3A:
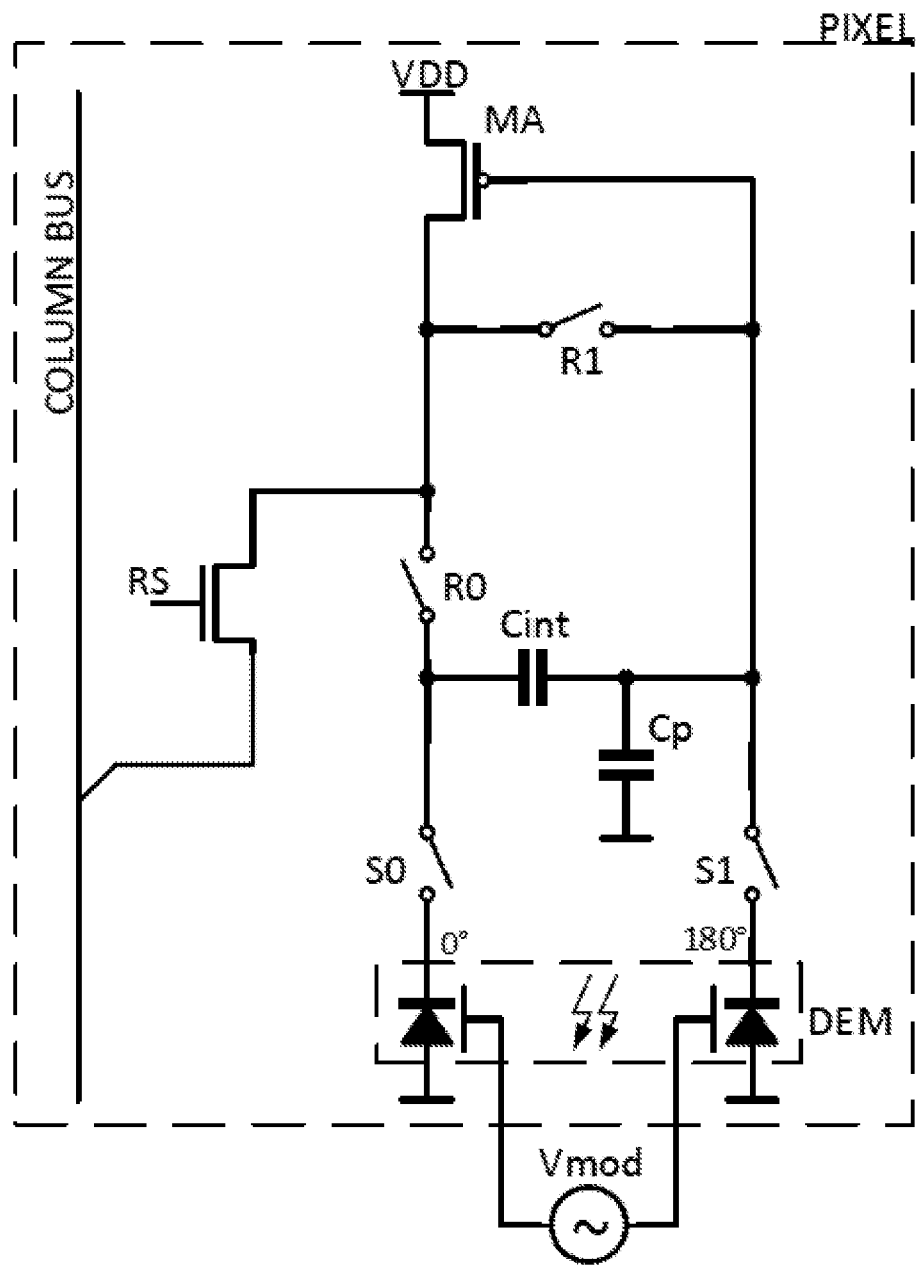
FIG. 3A illustrates a particular embodiment of the invention with a PMOS transistor used as an amplifier.

In FIG. 3A an embodiment of the pixel circuit according to the invention is shown. The pixel circuit comprises a dual ended detector that delivers a pair of photocurrent signals which are 180 degrees out of phase. The amplifier is implemented as a PMOS transistor MA. The number of transistors in the pixel architecture of FIG. 3A is minimized by sharing multiple functions with the same transistors:
PMOS transistor MA:
voltage reference in passive mode
amplifier in active mode
bus driver during readout
row select switch transistor RS:
bias for the voltage reference in passive mode
bias for the amplifier in active mode
row select switch during readout
switches S0 and S1 can be part of the demodulator structure (e.g. gates of PMD)

Figure 3B:
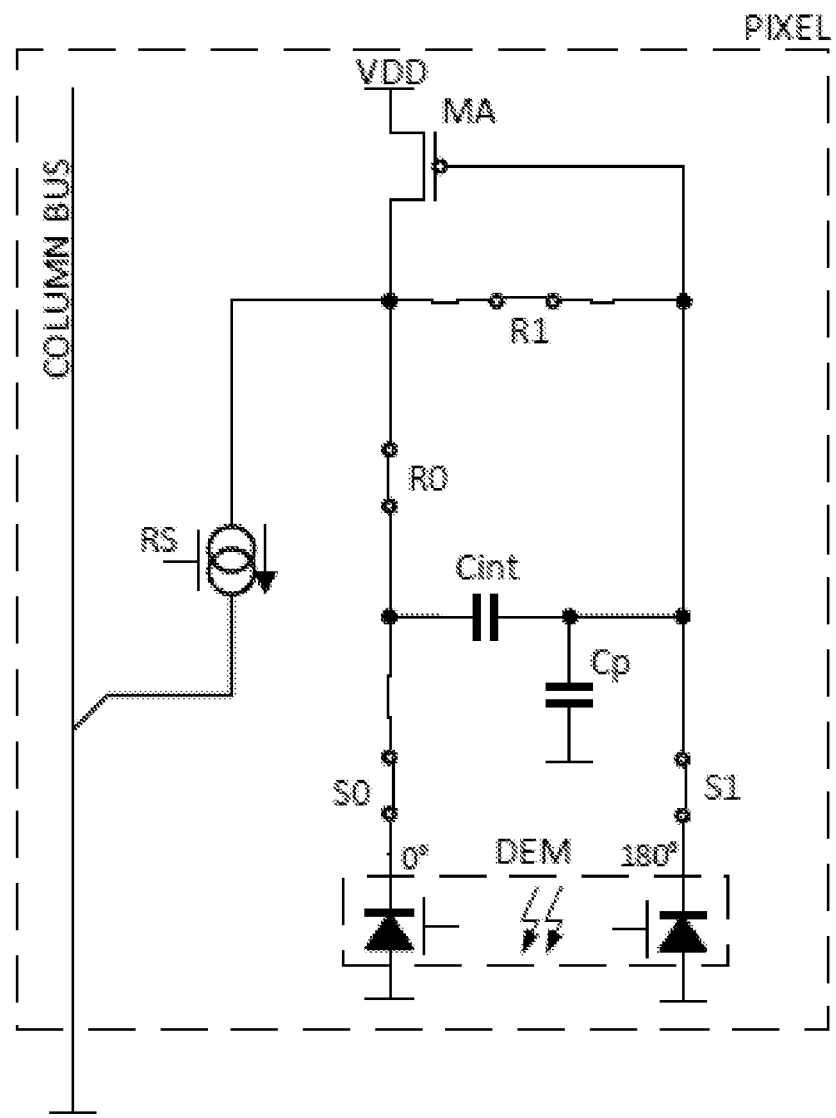
FIG. 3B illustrates a particular embodiment of the invention operating in a reset mode.
Figure 7:
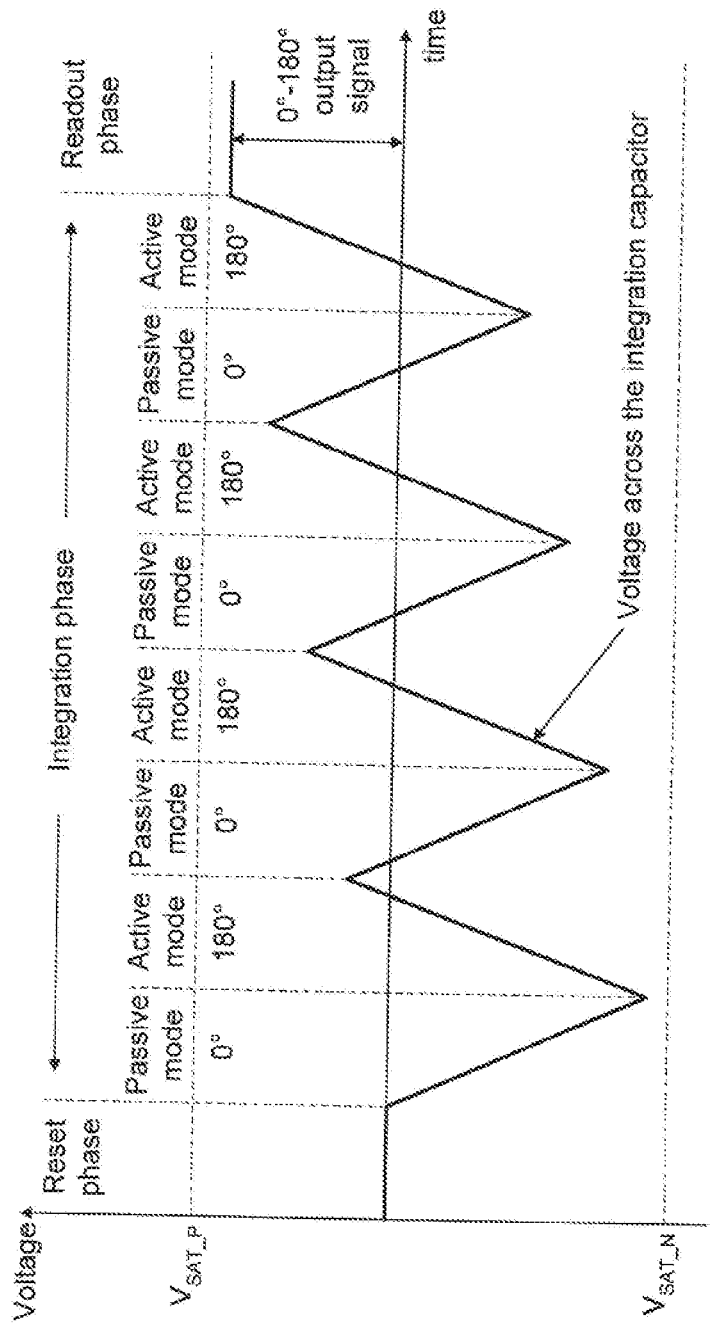
FIG. 7 illustrates a timing diagram of a particular embodiment of the invention.

Operation of the embodiment of the pixel circuit shown in FIG. 3A is now explained in detail. A timing diagram of the pixel operation is shown in FIG. 7. The pixel operation starts with resetting the integration capacitor Cint by closing the switches R0 and R1 in FIG. 3A. This yields the scheme of FIG. 3B. During this reset phase switches S0 and S1 can be in a conducting mode (fully conducting or cascode mode). At the end of the reset phase, a short term current bias is applied to transistor MA through row select transistor RS— this current bias to set the MA gate voltage and charges the parasitic capacitor Cp to this gate voltage. The bias current is selected to be higher than the maximum expected photocurrent so that the gate voltage is not dependent on the photocurrent.

Figure 4:
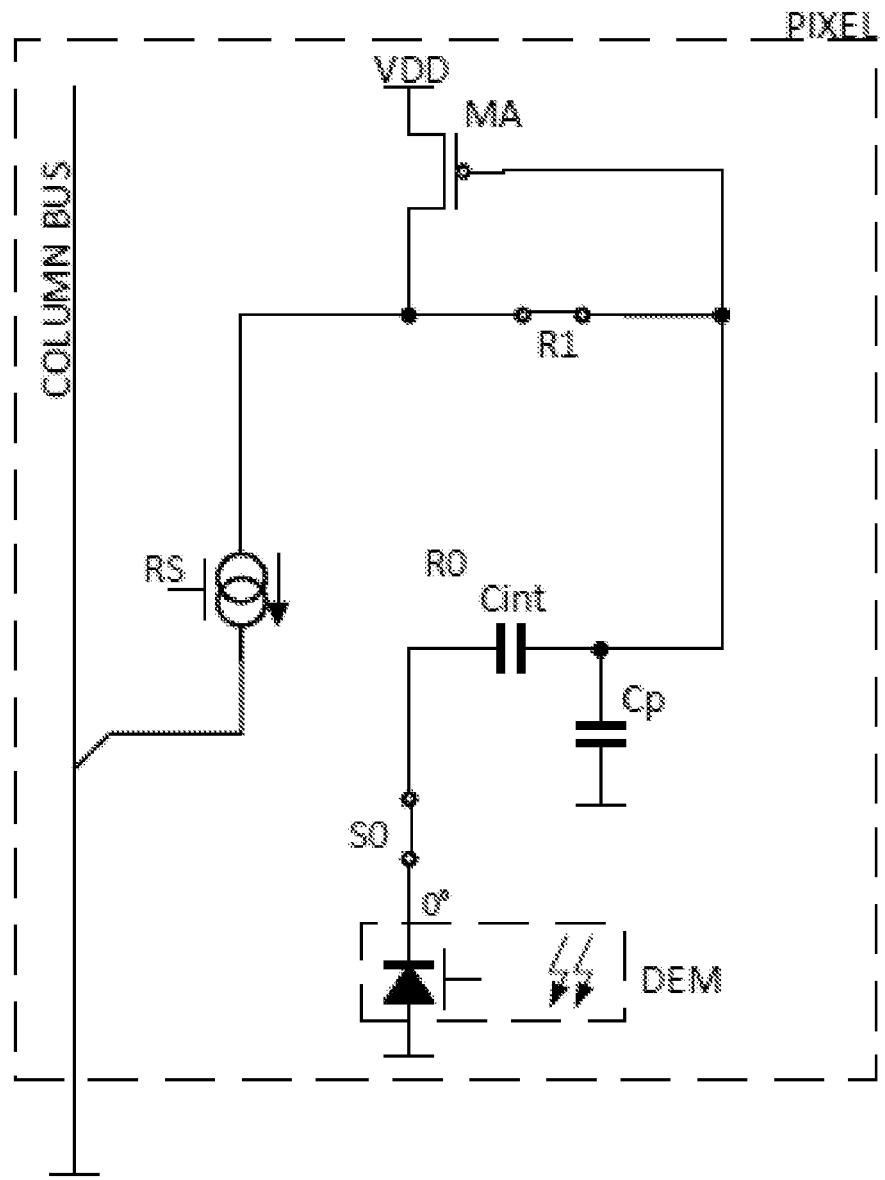
FIG. 4 illustrates a particular embodiment of the invention operating in a passive mode.

The integration starts from the passive integration mode, which is activated by opening switch R0 and closing switch S0. The photocurrent, demodulated with a 0° phase shifted reference signal, is flowing through the connected photodiode (the 0° phase shift is chosen to illustrate the operation of the pixel, however, any phase shift can be used). A pixel equivalent circuit at the beginning of the passive integration mode is shown in FIG. 4. After S0 and R0 switches toggle, the RS gate is pulled to ground stopping the bias current. During the integration, the integration capacitor is connected between the output of the photodiode DEM and MA transistor in a diode connection. The parasitic capacitor Cp is connected to the low impedance MA transistor connected as diode and does not take part in the photocurrent integration. The voltage on the MA gate is dependent on the photocurrent and thus is not very well defined during integration. At the end of the passive integration mode a current bias is applied through RS to set the voltage on the gate. Then the circuit is switched to an active integration mode.

Figure 5:
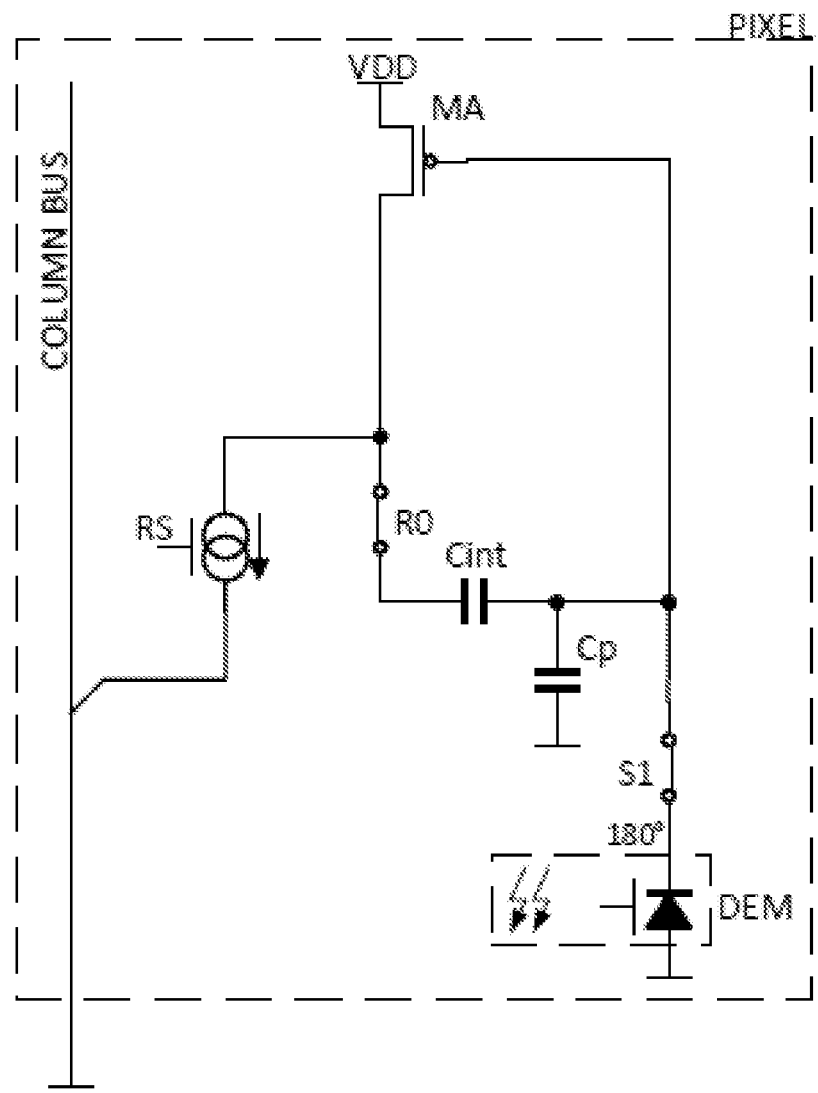
FIG. 5 illustrates a particular embodiment of the invention operating in an active mode.

The active integrator mode starts after opening switch R1, S0 and closing switches R0, S1. The photocurrent, demodulated with the 180° phase shifted reference signal, is flowing through the connected photodiode. After these commutations the MA gate is still set to a voltage defined by the bias current through RS, thus no charge loss through Cp occurred during the commutation. FIG. 5 shows an equivalent circuit of the pixel at the beginning of the active integration mode. Next, the bias current can be disabled and the active integrator circuit operates in photocurrent biased mode during the active integration phase. At the end of the integration, the current through RS is applied again to set the MA's gate voltage and the circuit is toggled into passive integrator mode again. After switching to the passive mode the parasitic capacitor Cp is again kept at the constant voltage, defined by the RS bias current and thus, no signal charge is lost during phase changes. At the end of the active phase, just a signal, proportional to the difference between 0° and 180° photocurrents, is left on the integration capacitor Cint; the common DC component which originates from a constant background illumination is cancelled.

As illustrated in FIG. 7, the invention helps to avoid saturation ($V_{SAT\_N}$ and $V_{SAT\_P}$) in the presence of a strong background light—a typical passive mode pixel would saturate shortly after a time equal to one passive mode integration of the invention. At the end of the series of active-passive modes, the integration capacitor Cp contains the accumulated differential (0 deg-180 deg) signal, all the common mode signal is subtracted. The length and number of passive and active modes can be optimized for a given illumination condition; this optimisation can be easily done by changing the timing of the control signals (R0, S0, R1 and S1).

Figure 6:
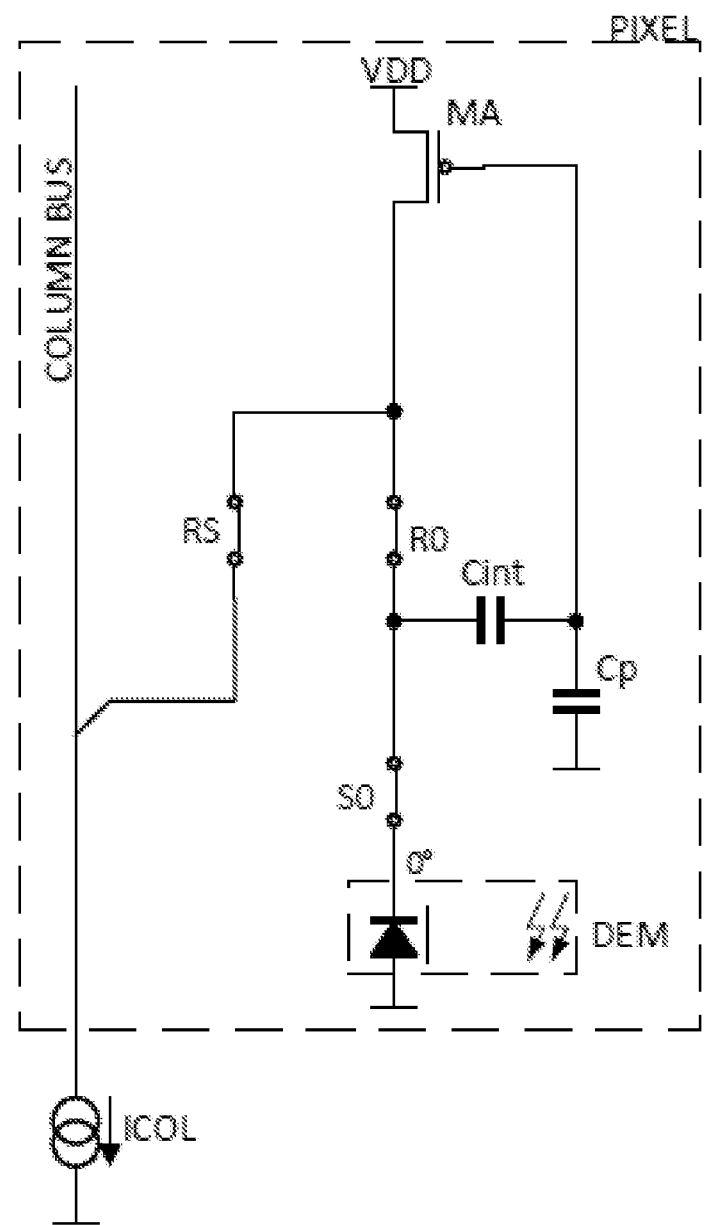
FIG. 6 illustrates a particular embodiment of the invention operating in a readout mode.

During the readout phase (FIG. 6) the RS, R0 and S0 switched are closed, R1, S1 are open. The column bus is driven by the MA transistor which is now biased with a current source connected to the column bus. The signal is sampled.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A pixel circuit for performing Time of Flight measurements, the pixel circuit comprising:
   at least one optical sensor arranged for receiving a reference modulation signal and a light signal and arranged for outputting a photocurrent signal depending on said light signal and on a phase shift corresponding to a phase difference between said light signal and said reference modulation signal,
   an integrator circuit comprising an integration capacitor, an amplifier and switching means,
   whereby said switching means are arranged for resetting said integration capacitor in a reset mode, for connecting said integration capacitor between said at least one optical sensor and a voltage reference signal in a passive mode, for connecting in an active mode said integration capacitor in a negative feedback loop comprising said amplifier, said negative feedback loop being fed with said photocurrent signal of said at least one optical sensor, and for connecting a signal output by said integrator circuit to an output bus in a readout mode.

2. The pixel circuit as in claim 1, where said amplifier of said integrator circuit is biased by said photocurrent signal during said active mode.

3. The pixel circuit as in claim 1, where said integrator circuit is arranged for receiving additional electrical current during transitions between said passive mode and said active mode.

4. The pixel circuit as in claim 3, comprising an additional electrical current source for providing said additional electrical current.

5. The pixel circuit as in claim 3, where a switch of said switching means is arranged to act as a current source for providing said additional electrical current.

6. The pixel circuit as in claim 1, where said integrator circuit is arranged to be biased by additional electrical current when operating in said active mode.

7. The pixel circuit as in claim 1, comprising at least two optical sensors arranged for outputting output signals with a different phase.

8. The pixel circuit as in claim 7, wherein said phase shift of said photocurrent signal is obtained by commutating between said output signals of said at least two optical sensors.

9. The pixel circuit as in claim 1, arranged for adjusting a ratio of operation in said active mode and said passive mode during a frame acquisition time.

10. The pixel circuit as in claim 1, comprising a buffer circuit for buffering said signal output by said integrator circuit.

11. The pixel circuit as in claim 1, where said integrator circuit is implemented as a transistor having a source terminal, a drain terminal, and a gate terminal,
    said transistor arranged for receiving at said source terminal a supply voltage from which said voltage reference signal is generated, having said drain terminal connected to a row select transistor and having said drain terminal and said gate terminal connected via a first switch,
    said drain terminal further connected via a second switch to a first charge sensing node,
    said first charge sensing node connected to a first photodiode demodulator via a third switch,
    said first charge sensing node connected to a second charge sensing node via an integration capacitor,
    said second charge sensing node connected to said gate terminal and connected via a fourth switch to a second photodiode demodulator and further also connected to ground via a parasitic capacitance.

12. A method for operating a pixel circuit as in claim 1 in a Time of Flight measurement, the method comprising the steps of:
    resetting said integration capacitor,
    activating the passive mode by adapting said switching means of said pixel circuit,
    connecting said integration capacitor during the active mode in the negative feedback loop comprising said amplifier of said pixel circuit and applying said photocurrent signal of said at least one optical sensor to said negative feedback loop,
    connecting the signal output by said integrator circuit to an output bus in a readout mode.

13. The method for operating a pixel circuit as in claim 12, wherein said active mode is activated before said passive mode.

14. The method for operating a pixel circuit as in claim 12, wherein at least two times the integrator circuit is switched between said active and said passive modes.

* * * * *